(12) United States Patent
Winter et al.

(10) Patent No.: US 10,271,090 B2
(45) Date of Patent: Apr. 23, 2019

(54) DYNAMIC VIDEO CONTENT APPARATUSES, SYSTEMS AND METHODS

(75) Inventors: Richard Winter, Honolulu, HI (US);
Thomas F. Jung, San Rafael, CA (US);
Predraq Dozgic Krpan, Larkspur, CA (US)

(73) Assignees: Richard Winter, Honolulu, HI (US);
Thomas F. Jung, San Rafael, CA (US);
Predraq Dozgic Krpan, Larkspur, CA (US)

( * ) Notice: Subject to any disclaimer, the term of this patent is extended or adjusted under 35 U.S.C. 154(b) by 1281 days.

(21) Appl. No.: 12/892,203

(22) Filed: Sep. 28, 2010

(65) Prior Publication Data
US 2012/0030726 A1    Feb. 2, 2012

Related U.S. Application Data

(60) Provisional application No. 61/369,300, filed on Jul. 30, 2010.

(51) Int. Cl.
| | |
|---|---|
| *H04N 21/43* | (2011.01) |
| *H04N 21/431* | (2011.01) |
| *H04N 21/462* | (2011.01) |
| *H04N 21/81* | (2011.01) |
| *G06Q 30/02* | (2012.01) |

(52) U.S. Cl.
CPC ..... *H04N 21/4316* (2013.01); *G06Q 30/0241* (2013.01); *G06Q 30/0251* (2013.01); *H04N 21/4622* (2013.01); *H04N 21/812* (2013.01)

(58) Field of Classification Search
USPC .......................................................... 725/114
See application file for complete search history.

(56) References Cited

U.S. PATENT DOCUMENTS

| | | | |
|---|---|---|---|
| 7,225,456 B2 | 5/2007 | Kitsukawa et al. | |
| 7,974,869 B1 * | 7/2011 | Sharma et al. | 705/7.31 |
| 2002/0016967 A1 * | 2/2002 | Carlile | 725/78 |
| 2002/0120935 A1 * | 8/2002 | Huber et al. | 725/60 |
| 2004/0117819 A1 * | 6/2004 | Yu | 725/32 |
| 2004/0261100 A1 | 12/2004 | Huber et al. | |
| 2005/0204381 A1 * | 9/2005 | Ludvig et al. | 725/34 |
| 2006/0036485 A1 * | 2/2006 | Duri et al. | 705/14 |
| 2007/0061838 A1 * | 3/2007 | Grubbs et al. | 725/35 |

(Continued)

*Primary Examiner* — Nathan J Flynn
*Assistant Examiner* — Christen A Kurien
(74) *Attorney, Agent, or Firm* — Dinsmore & Shohl LLP

(57) ABSTRACT

A media control player includes a central processing unit, a graphics processing unit, an audio/video input, an audio/video output, a memory device, and a media control player housing. The media control player to receives broadcast content from a broadcast source and proprietary targeted messages from a proprietary targeted message source. The proprietary targeted messages are based on one or more viewers within a viewing area of a display device, sales data associated with the one or more viewers, and inventory data selected based at least in part on the sales data. The media control player combines the proprietary targeted messages and the broadcast content into a merged output signal, and provides the merged output signal to the display device such that the proprietary targeted messages are displayed in a message region of the display device and the broadcast content is displayed in a broadcast content region of the display device.

17 Claims, 4 Drawing Sheets

(56) References Cited

U.S. PATENT DOCUMENTS

| | | |
|---|---|---|
| 2007/0107011 A1 | 5/2007 | Li et al. |
| 2007/0143802 A1 | 6/2007 | Hope et al. |
| 2008/0046942 A1* | 2/2008 | Merlin .......................... 725/110 |
| 2008/0066107 A1 | 3/2008 | Moonka et al. |
| 2009/0172724 A1* | 7/2009 | Ergen et al. .................... 725/32 |

* cited by examiner

DYNAMIC VIDEO CONTENT APPARATUSES, SYSTEMS AND METHODS

CROSS-REFERENCE TO RELATED APPLICATIONS

This application claims the benefit of U.S. Provisional Patent Application Ser. No. 61/369,300, filed Jul. 30, 2010, the entire disclosure of which is hereby incorporated herein by reference.

TECHNICAL FIELD

The present specification generally relates to the presentation of dynamic video content on display devices viewed by patrons of a residence, business or enterprise and, more specifically, to apparatuses, systems and methods for simultaneously presenting proprietary targeted messages and broadcast content to viewers of one or more display devices.

BACKGROUND

As background, businesses and other institutions often provide one or more televisions or other display devices in a waiting room so that customers or patients may be entertained while waiting for particular services. Exemplary businesses and institutions may include emergency rooms, medical waiting rooms, car dealerships, banks, golf clubs, health clubs, restaurants, bars, and many others. Small and mid-sized businesses often install a television in the waiting room to show cable or satellite broadcast entertainment to its customers in the waiting room or other facility.

It may be desirable for an owner or operator of a business to utilize the digital display to not only display broadcast content to entertain its patrons, but also to provide advertisements. Business owners may wish to provide their own targeted messages on the display devices without requiring expensive equipment, contracts with advertising agencies, and hosting service providers. Presently, multi-display digital advertising systems offer no low-cost solution for integrating business-specific content with television broadcast video. Thus, few small and medium sized businesses show digital advertising on their display devices. Further, no advertising systems allow businesses to automatically develop custom, targeted information (e.g., advertisements) based on available inventory data and the particular patrons that are watching the display device.

Accordingly, a need exists for alternative apparatuses, methods and systems for dynamic video content that enable businesses to simultaneously display broadcast content with proprietary targeted messages that are based on available inventory data and the viewers within a viewing range of the display device.

SUMMARY

In one embodiment, a media control player includes a central processing unit, a graphics processing unit, an audio/video input, an audio/video output, a memory device, and a media control player housing. The memory device stores executable instructions that, when executed by the central processing unit, causes the media control player to receive broadcast content from a broadcast source and to receive proprietary targeted messages from a proprietary targeted message source at the audio/video input. The proprietary targeted messages are based at least in part on one or more viewers within a viewing area of a display device, sales data associated with the one or more viewers, and inventory data selected based at least in part on the sales data. The executable instructions further cause the media control player to instruct the graphics processing unit to combine the proprietary targeted messages and the broadcast content into a merged output signal, and provide the merged output signal to the display device through the audio/video output such that the proprietary targeted messages are displayed in a message region of the display device and the broadcast content is displayed in a broadcast content region of the display device. The central processing unit, the graphics processing unit, the audio/video output, the audio/video input and the memory device are maintained within the media control player housing.

In another embodiment, a method of providing proprietary targeted messages and broadcast content on a display device includes receiving broadcast content from a broadcast content source, determining one or more viewers within a viewing area of the display device, and obtaining information associated with the one or more viewers. The information is based at least in part on sales data corresponding to the one or more viewers within the viewing area of the display device. The method further includes receiving inventory data corresponding with a plurality of in-stock articles or available services from an inventory system, selecting individual ones of the plurality of in-stock articles or plurality of available services based at least in part on the information of the one or more viewers within the viewing area, creating at least one proprietary targeted message based at least in part on the selected in-stock articles or the selected available services and the information of the one or more viewers within the viewing area, and merging the proprietary targeted messages and the broadcast content into a merged output signal. The merged output signal is provided to the display device such that the display device simultaneously displays the targeted messages and the broadcast content.

In yet another embodiment, a system for providing proprietary targeted messages and broadcast content on a display includes a media control player and a remote server. The media control player includes a central processing unit, a graphic processing unit, an audio/video output, and at least one memory device. The media control player is operable to be coupled to a display device, receive broadcast content from a broadcast source, and provide a merged output signal to the display device. The remote server is communicatively coupled the media control player, an inventory system, an appointment system, and a sales system. The remote server is operable to receive inventory data from the inventory system, to receive sales data from the sales system, and to receive appointment data from the appointment system. Further, the remote server is programmed to enable a user or agent to develop one or more targeted message templates via an interface, select individual ones of a plurality of in-stock articles or available services based at least in part on the inventory data, the sales data, the appointment data, and one or more viewers within a viewing area of the display device, populate the targeted message templates with data corresponding to the selected in-stock articles or available services to create proprietary targeted messages, and transmit the proprietary targeted messages to the media control player. The media control player is operable to receive the proprietary targeted messages and generate the merged output signal by combining the proprietary targeted messages with the broadcast content such that the broadcast content and the proprietary targeted messages are simultaneously displayed on the display device via the audio/video output.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments described herein are directed to dynamic video content apparatuses, systems and methods that enable business and other institutions to provide broadcast content as well as targeted messages to persons watching a display device in a waiting room of the business or institution. Exemplary business or institutions may include car dealerships, doctor's offices, hospitals, restaurants, etc. Embodiments may also be utilized in a residence, for example. Generally, embodiments described herein merge broadcast content (e.g., television signals from cable providers, satellite providers, over-the-air broadcasters, streamed content, and/or locally stored content) with customized proprietary targeted messages (e.g., advertisements provided by the business or agent of the business, information related to an individual, etc.) such that the images displayed on the televisions simultaneously include both the broadcast content of the television feed signals and the proprietary targeted messages. Embodiments may enable a business to directly interact with its television or televisions in real time. In at least one embodiment, sales data associated with one or more viewers of the display device located in the waiting room is obtained. Available inventory data is also accessed and retrieved based on the sales data and the viewer of the display device to provide dynamic proprietary targeted messages to the particular user that reflects currently available articles and/or services. Using the sales data and the available inventory data, embodiments may enable the operator of the business or institution to place narrowcast messages in front of viewers while they wait in the waiting room. Various embodiments of dynamic video content apparatuses, systems and methods will be described in more detail herein.

Figure 1:
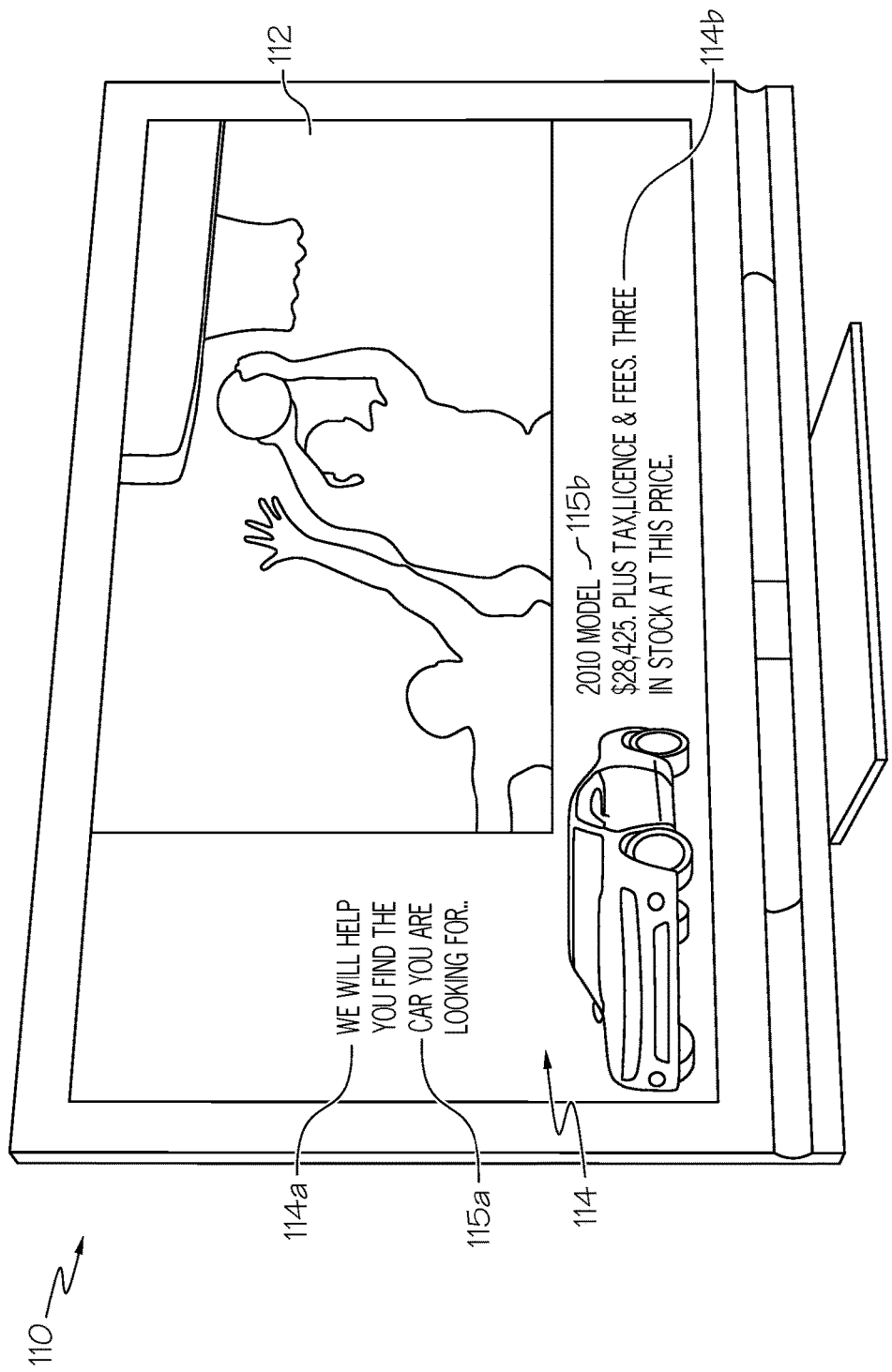
FIG. 1 depicts an illustration of a display device having a broadcast content region and a message region according to one or more embodiments described and illustrated herein.

Referring initially to FIG. 1, an exemplary display device 110 displaying both broadcast content and proprietary targeted messages is depicted. The display device 110 illustrated in FIG. 1 is a flat screen LCD or plasma television that may be mounted on a wall or positioned on a stand. The display device 110 is not limited to a flat screen television and may be any device that is capable of receiving and displaying video content. As further examples and not limitations, the display device 110 may be a cathode ray tube television, a computer monitor, a laptop computer, a netbook computer, a tablet computer, a smart phone, a personal digital assistant, or a digital picture frame. The display device 110 should have a means to receive a merged output signal from a media control player that is described in more detail below. Exemplary display device inputs include HDMI, coaxial, composite, component, RCA, and wireless communication ports (e.g., IEEE 802.11).

As illustrated in FIG. 1, embodiments described herein may resize the video of the broadcast content such that the broadcast content may be displayed in a broadcast region 112 of the display device 110, and proprietary targeted messages may be displayed in a message region 114 of the display device 110. For example, the broadcast region 112 illustrated in FIG. 1 is displaying a basketball game. As used herein, the phrase broadcast content means any audio/video (including static images) that is not the proprietary targeted messages, and may include, without limitation, cable-provided content, satellite-provided content, over-the-air transmitted content (e.g., local television broadcasters), content that is streamed over a network such as the Internet, proprietary content developed by the owner of the business providing the display device (e.g., a video on the history of the company), or content that is locally stored on the media control player (described below). The broadcast content may be streamed from a server by a third party (e.g., Netflix, Hulu, YouTube, etc.) or a server operated by the owner or management of the business providing the display device.

The message region 114 displayed on the display device 110 illustrated in FIG. 1 has a side portion 114a on the left side of the screen, and a bottom portion 114b on the bottom of the screen. It should be understood that embodiments are not limited to the illustrated message region configuration, as many other configurations are possible. For example, the side portion 114a may be positioned on the right side rather than the left side, the bottom portion 114b may be positioned on the top of the screen, there may only be one portion, etc. In one embodiment, there may be two or more broadcast regions being displayed on the display device.

As described in more detail below, proprietary targeted messages 115a,115b may be displayed in the message region 114 of the display device 110. The proprietary targeted messages may be configured as static images, as well as video and audio content. The message region 114 may act as a narrowcasting medium in that targeted, customized advertisements may be displayed on the display device 110 within the message region 114 to the particular customers in the waiting room. In this manner, customers may view advertisements presented in the message region 114 while watching the broadcast content in the broadcast region 112. Advertisements or messages may be configured as slides that are displayed in the message region 114. Although the proprietary targeted messages are described herein in the context of advertising, it should be understood that the proprietary targeted messages may include information on any subject. Further, the targeted message are described herein as proprietary because they are specific to the business operating the display device or devices.

The proprietary targeted messages may be advertisements that are related to the particular business of which the display device 110 is installed. For example, a first proprietary targeted message 115a may be displayed in the side portion 114a and a second proprietary targeted message 115b may be displayed in the bottom portion 114b. As described in more detail below, the proprietary targeted messages 115a, 115b may be based upon inventory data such that the targeted messages pertain to inventory and services that are currently available for purchase. The proprietary targeted messages 115a, 115b may also be based on sales data associated with the viewers in a viewing range of the display device 110 such that they are targeted directly for those viewers. As such, the message region 114 may act as a narrowcasting medium in that targeted, customized advertisements may be displayed on the display device 110 within the message region 114 to the customers in the waiting room. In this manner, customers may view the advertisements presented in the message region 114 while viewing the broadcast region 112. As described in more detail below, proprietary targeted messages may be configured as slides that are displayed in the message region 114.

Figure 2:
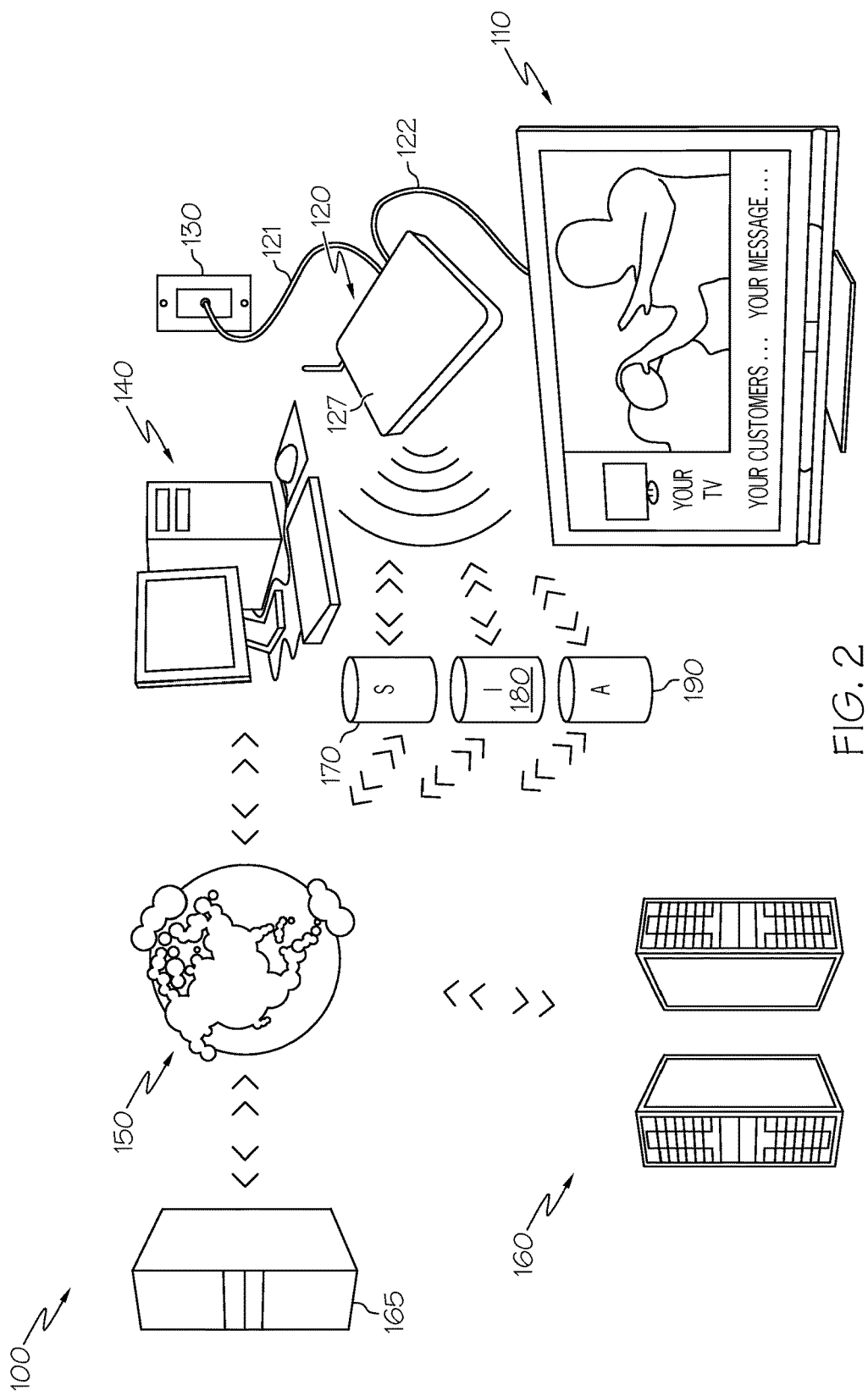
FIG. 2 depicts a schematic diagram of a dynamic video content system according to one or more embodiments described and illustrated herein.
Figure 3:
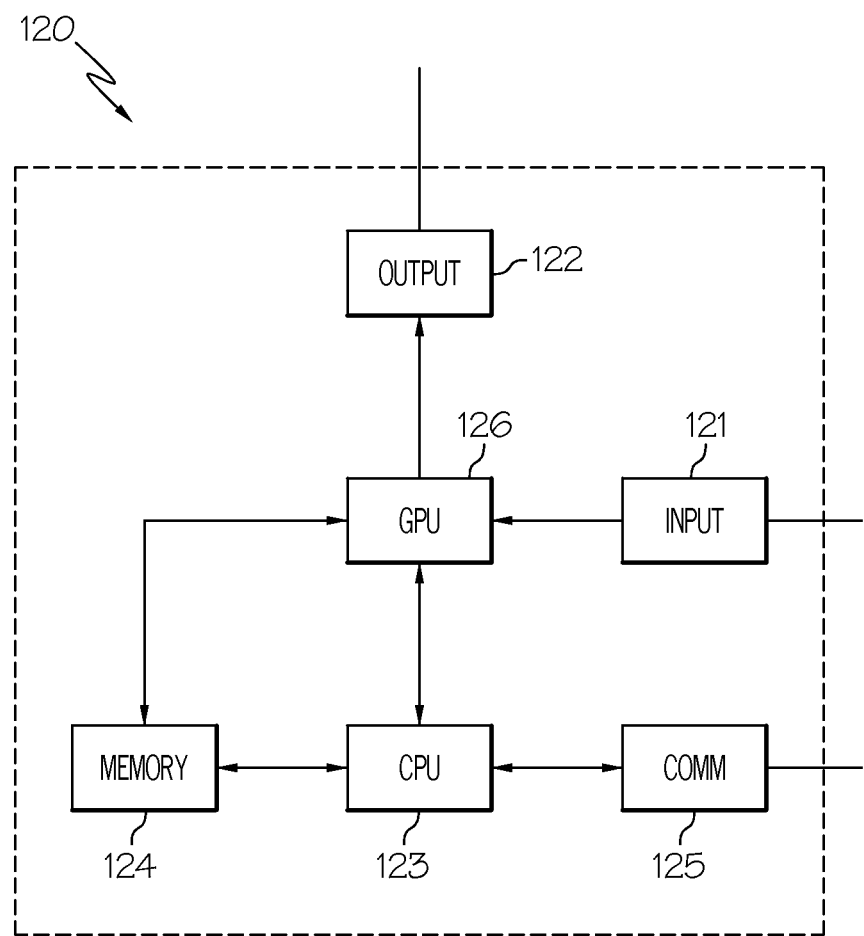
FIG. 3 depicts a schematic diagram of a media control player according to one or more embodiments described and illustrated herein.

Referring now to FIGS. 2 and 3, one embodiment of a dynamic video content system 100 is illustrated. The dynamic video content system 100 comprises a media control player 120 that is coupled to a broadcast source 130 via an input connection 121 and a display device 110 via an output connection 122. Although FIG. 2 illustrates the input connection and output connection as being wired connections, it should be understood that embodiments may also utilize wireless input and output connections. The media control player 120 may be connected to a cable or satellite box (e.g., a set-top box, not shown) via the input connection 121 through which the broadcast content is received. The media control player 120 is communicatively coupled to a computer 140 that may be used to configure the media control player 120. The computer 140 may be wirelessly coupled to the computer via a local area network, for example. The computer 140 may be located at the business or it may be remotely located.

As described in more detail below, the media control player 120 and/or the computer 140 is communicatively coupled to an inventory system 180, a sales system 170, and an appointment system 190 that are associated with the business operating the display device. For example, if the business is a car dealership, the inventory system 180 may include a database having a plurality of records and data corresponding to in-stock vehicles, vehicle services, and parts. The records and data may include images and descriptions of the in-stock articles and services. The appointment system 190 may be a database that maintains the appointment schedule of all of the customers, and the sales system 170 may be a database that maintains purchases made by the customers of the car dealership (e.g., make and model of a purchased car, services purchased, etc.).

The computer 140 and the media control player 120 is coupled to one or more remote central servers 160. As described in more detail below, the central server 160 maintains software operable to configure the media control player 160, receive inventory and sales data from the computer 140 and/or the media control player 120, configure the proprietary targeted messages, and transmit the proprietary targeted messages to the media control player 120 (either directly or through the computer 140) for display on the display device 110.

The computer 140 and/or media control player 120 may also be coupled to a third party server 165 (or servers). The third party server 165 may be operated by a third party agent, such as an advertising/marketing firm, data aggregator, information provides, etc. As described in more detail below, third party agents may provide a wide variety of services that may be utilized to develop and/or provide the proprietary targeted messages. For example, in one embodiment the third party server 165 may develop and send proprietary targeted messages to the computer 140 and/or media control player 120. Further, the third party server, in the data aggregator context, may provide information relating to specifics of individuals to the computer, media control player 120, and/or the remote central server 160. For example, if the third party is a data aggregator, it may transmit information regarding persons that are within viewing range of the display device 110.

Referring now to FIG. 3, a schematic diagram of an exemplary media control player 120 is illustrated. Generally, the illustrated media control player 120 comprises a central processing unit 123, a graphics processing unit 126, a memory device 124, a communications module 125, an audio/video input 121, and an audio/video output 122. The central processing unit 123 may be a multi-core microprocessor, such as those manufactured by Intel, AMD, Marvell, and Texas Instruments, for example. The audio/video input 121 may have input connection capabilities (e.g., HDMI, composite, s-video, component, and RCA) for receiving audio and video data. The audio/video input 121 may be a video capture device operable to capture broadcast content signals and convert such signals into digital signals for further processing, such as merging the broadcast content with the proprietary targeted messages, as described below. For example, the audio/video input 121 may be configured as an external video capture device that is coupled to the media control player 120 via a USB connection. The audio/video input 121 may also be an internal device that is maintained within the media control player 120.

The graphics processing unit 126 should be a high-capacity device capable of receiving and processing the incoming broadcast content and proprietary targeted messages to render the merged output signal such that the broadcast content and proprietary targeted messages are simultaneously displayed on the display device 110. The graphics processing unit 126 should have at least 128 MB of internal memory. In one embodiment, the graphics processing unit 126 is capable of outputting high definition video content to the display device 110. The audio/video output 122 may be associated with the graphics processing unit 126. For example, the graphics processing unit 126 may be a graphics card having one or more integral output connections. The output connections may include, but are not limited to, HDMI, VGA and audio to RCA, component, and composite connections. The generated merged output signal is outputted from the media control player 120 to the display device 110 via the audio/video output 122 connections. As illustrated in FIG. 1, the media control player 120 may be connected to the display device 110 through the audio/video output 122 and associated cables and connectors.

The communications module 125 is configured to enable both wired and wireless communication with external components and devices. The communications module 125 may be a wireless communications card capable of communicating via protocols such as, but not limited to, IEEE 802.11x, Bluetooth, and/or IEEE 802.3 Ethernet protocol. The media control player 120 may communicate over an unsecured wireless network, local area network or a wide area network. The communications module 125 is used to communicate with the computer 140, the remote server(s) 160, sales system 170, inventory system 180, and/or appointment system 190. The communications module 125 may also be utilized to wirelessly push the merged output signal comprising the merged broadcast content and proprietary targeted messages to one or more display devices 110.

The memory 124 may comprise one or more memory devices, such as volatile memory (e.g., SRAM devices, DRAM devices) and non-volatile memory (e.g., flash memory devices, hard disk memory devices). The memory 124 has computer executable instructions that enable the central processing unit 123 to perform the various actions of the dynamic video content methods described herein. For example, the computer executable instructions may be a proprietary software program or programs that is stored on the hard disk of the media control player 120. The software program instructs the central processing unit 123 to perform various tasks, such as retrieving the proprietary targeted messages from the remote central server 160 and merging such messages with the broadcast content into the single merged output signal. The central processing unit 123 coordinates the tasks of the graphics processing unit 126, audio/video input 121 and communications module 125 (as well as other miscellaneous components). In one embodiment, the memory 124 includes a hard disk having a storage capacity capable of storing videos such as proprietary content videos (e.g., a short video regarding the history of the business, proprietary commercials, television shows, movies, etc.) that the business owner or other personnel wishes to display in the broadcast region of the display device. The memory 124 may also be used to cache necessary content in case of a network connection problem such that the media control player 120 may continue to display the broadcast content with the proprietary targeted messages that are cached.

Figure 4:
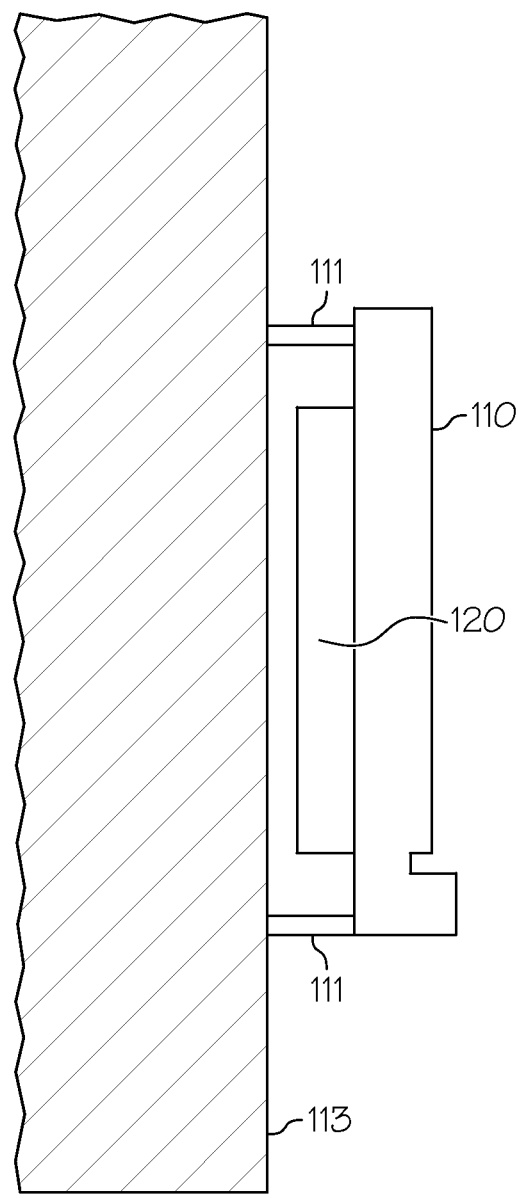
FIG. 4 depicts an illustration of a media control player mounted to a display device according to one or more embodiments described and illustrated herein.

The components of the media control player described above may be maintained in a housing 127 (FIG. 1), such as a computer housing. The media control player 120 may be configured as a small computer device, such as mini-sized desktop computer or netbook. Referring to FIG. 4, the overall size of the media control player 120 should be small enough such that it may be mounted onto a backside of the display device 110 such that it is hidden between the display device 110, display device mounting hardware 111, and a wall 113. In one embodiment, the media control player 120 has a length of less than about 190 mm, a width of less than about 190 mm, a height of less than about 50 mm, and a weight of less than about 1000 grams such that it may be inconspicuously hidden on the backside of the display device 110. It should be understood that the media control player 120 may have other dimensions that enable it to be hidden behind the display device.

In one embodiment, the media control player 120 is configured as a mini-sized computer, such as the Acer AspireRevo with an NVidia Ion graphics processor as the graphics processing unit 126. It should be understood that other computer devices may also be utilized and that the Acer AspireRevo is being used herein as one example of a computer device that may be used. In this embodiment, the media control player 120 runs the Windows XP operating system, although other operating systems may be used, such as Linux (e.g., Ubuntu) or Mac OSX offered by Apple. To capture incoming broadcast content (e.g., from a cable or satellite provider), the video input 121 comprises a USB video capture device, such an Hauppauge 950Q USB video capture dongle, or an internal video capture card. Software and hardware may cooperate to input the incoming video signal and resize it such that it appears on the display device within the broadcast content region. Exemplary software programs to capture and process incoming video include TVideoGrabber by Datastead (as a Microsoft DirectShow wrapper) or MPlayer, for example. As described above, the graphics rendering software resizes the incoming video such that it fits within the broadcast region of the display device, and merges the incoming video with the proprietary targeted messages as a merged output signal.

Referring generally to FIGS. 1-3, functionality and methods of the media control player 120 and dynamic video content system 100 will now be described. As stated above, embodiments described herein merge broadcast content with targeted advertisements based on viewers near a display device in a waiting room and current inventory data of the business operating the display device. The proprietary targeted messages are then displayed simultaneously with the broadcast content using a single merged output signal generated by the media control player 120. Embodiments merge the broadcast content and targeted messages using software as described above, which may eliminate the need for scalers or other similar hardware to provide the content in the desired region of the display device. However, it should be understood that the embodiments described here may also be implemented with such scaling hardware.

A business, such as a car dealership, may have a television (display device 110) installed in a waiting room for patrons to view and be entertained while waiting for their cars to be serviced. To enable the television to display the proprietary targeted messages, the business may utilize the components and services of the embodiments described herein. The media control player 120 is communicatively coupled to the television and a broadcast source, such as a cable or satellite box.

A portal or interface may be used to configure the media control player 120 to operate with the particular make, model and size of the television display device. In one embodiment, the interface is a web-portal that the user accesses over the Internet via the computer 140 or other computing device. The web-portal may be accessed using a secure login. In this manner, the media control player 120 may be configured by the user to operate with any television or other display device. This may enable the user to quickly set up a new display device.

The portal may also be an interface for the user to develop custom slides to be displayed as the proprietary targeted messages on the display device. For example, the user may log into the portal and select one or more slide templates that he or she may use as a base for the desired slides. The various templates may provide many different design varieties, such as background color, background design (e.g., stripes, shapes), size, images, icons, fonts, stock images, etc. Slides intended for the side portion 114*a* and the bottom portion 114*b* may be selected in such a manner.

The slide templates may have blank text fields in which the user may insert the text messages 115 into the slide template. The text may be entered manually, or automatically from the inventory system 180, as described in more detail below. The slide templates may also have regions into which the user may place an image, such as a picture of an in-stock article. The pictures may also be pulled from the inventory system 180. The slides representing the proprietary targeted messages may also be designed by the user from scratch without the use of slide templates.

Other parameters may also be set using the portal, such as duration of each slide, time of day the particular slide is to be displayed on the display device, grouping of slides into playlists. The portal is also used to set parameters for automatically generating slides based on the viewers in viewing range of the display device and available inventory. These proprietary targeted messages are automatically generated when the particular viewers are watching the display device, and are created specifically for those viewers. Data for the various slides of the proprietary targeted messages may also be designed/provided by third party agents, such as an advertising agency, publishing agency or other similar entity. In one embodiment, the slides provided by the third party agent(s) may originate from the third party server 165 as illustrated in FIG. 2. As describe above, third party agents may also provide additional profile information regarding persons that may view the display device. The profile information provided by the third party agent(s) may be utilized to select articles from the inventory system and aid in developing proprietary targeted messages.

The development of the proprietary targeted messages is controlled by a client controlled hierarchy meaning that different entities may develop the messages. For example, the owner of the business, a third party agent (e.g., an advertising agency), or a designated agent, and the operator of the dynamic video content system may develop the proprietary targeted messages. One individual or entity may develop and provide proprietary targeted messages to many different media control players and display devices.

The remote server 160 may be in communication with the sales system 170, the inventory system 180, and/or the appointment system 190 of the particular business. The remote server 160 may pull inventory, sales or appointment data at regular intervals (e.g., nightly), or the computer 140 or the media control player 120 may push the inventory, sales or appointment data to the remote server 160 at regular intervals. This data may then be used to determine when and what type of proprietary targeted messages should be displayed on the display device. The remote server 160 create and transmit the custom slides to the media control player 120 over the Internet.

Inventory data that may be of interest to particular viewer may be populated into the slide template to create a slide that is targeted to the user. The slide represents the proprietary targeted message that will be displayed when the particular viewer is expected to be within viewing range of the display device. Because the slides are populated with available inventory data from the inventory system 180, the slides contain the most current information regarding the products and services that are available.

The viewers that are present within a viewing range of the display device (e.g., within a waiting room) may be determined in a variety of ways. In one embodiment, the remote server 160 pulls appointment data from the appointment system operated by the business. The remote server 160 may pull names of individuals that have a scheduled appointment for that day. In this manner, the remote server 160 anticipates the individuals that will be in the waiting room and at what time. In another embodiment, the customer may register with an employee of the business for his or her appointment. Upon checking in with the employee, the name of the customer may be sent to the remote server 160 such that the remote central server 160 anticipates that the customer will be in viewing range of the display device 110. In yet another embodiment, the media control player 120 may detect the identity of the user via a mobile device identification signal. For example, a customer's mobile device may broadcast an identification signal that the media control device 120 receives. The customer may also be provided with an identification device (e.g., a RFID claim check) that he or she carries while they are waiting such that the remote server 160 anticipates who is in the waiting room. In another embodiment, the media control player 120 or the remote server 160 may be in communication with a third party that detects the location of subscribers and indicates the arrival of a subscriber at the particular business. For example, a customer may have a geo-locating application (e.g., Foursquare) installed on his or her cellular phone such that the geo-locating application operator may notify the remote server 160 or the media control player 120 of the arrival of the particular customer.

Once the identities of the viewers that are near the display device 110 are determined, the inventory data obtained from the inventory system 180 may be filtered to retrieve only currently available articles and services that may be desirable to such particular viewers. The remote server 160 may utilize the sales data obtained from the sales system 170 to build a profile of the particular viewers. The sales data represents previous purchases made by the viewer. For example, in the car dealership example, the sales data may indicate that a particular customer/viewer purchased a black Ford 150 in 2005. The sales data may also indicate the particular vehicle options (e.g., sun roof, sports package), parts (e.g., tires) and service options (e.g., fuel line flush, tire rotation) the customer/viewer purchased in the past. The sales data is used by the remote server 160 to learn what types of products and/or services particular customers/viewers would be most receptive to and the inventory data is filtered accordingly. Images and text associated with filtered inventory data may then be automatically populated into the slide templates to generate the proprietary targeted messages.

The populated slides/proprietary targeted messages then are sent to the media control player 120 by the remote server 160. The media control player 120 then merges the proprietary targeted messages with the live (or locally stored) broadcast content being received at the audio/video input (on within the memory 124 of the media control player 120) into a merged output signal. The media control player 120 is programmed to resize the broadcast content such that it fits within the broadcast region 112 of the display device according to the parameters of the particular display device, and displays the proprietary targeted messages in the message region(s) 114. In another embodiment, the broadcast content is overlaid onto the proprietary targeted messages. In another embodiment, the proprietary targeted messages are overlaid onto the broadcast content. The merged output signal is then provided to the display device 110 at the audio/video output 122.

The broadcast content displayed on the display device may be controlled locally like any other television. For example, a viewer desiring to change the channel may simply change the channel on the cable or satellite box. When the viewer changes the channel, the broadcast content displayed in the broadcast region of the display device changes accordingly. Therefore, local control of the display device may be maintained.

The proprietary targeted messages may also be configured in such a way that images or video of the targeted message encroaches or is otherwise positioned within the broadcast region of the display device. The proprietary targeted message may be configured such that a person, object or text appears overlaid on the broadcast content being displayed. As an example and not a limitation, an animation of a person may appear in the bottom region of the broadcast region of the display device to display a message to the viewer.

In one embodiment, proprietary content prepared by the business (e.g., commercials specific to the business operating the display device) may be intermittently displayed within the entire area of the television screen. For example, the media control player may be configured via the portal to display a certain number of advertisement slides along with the television feed of the broadcast content in the broadcast region of the display device before displaying one or more proprietary commercials generated by the particular business or an agent of the particular business. After completion of the commercial (or commercials), the television feed of the broadcast content within the broadcast region may resume. For example, the media control player may be configured to display the broadcast content and proprietary messages for a predetermined period of time (e.g., fifteen minutes). After the fifteen minute, the media control player may then display proprietary content associated with the business for a second predetermined period of time (e.g., three minutes). After the completion of the commercial, the medial control player may resume displaying the broadcast content and the proprietary targeted messages. The proprietary commercials/content may be stored on media control player or the remote server 160 (or any other remote server or device).

Further, embodiments may be operable to push the merged output signal to multiple display devices over the wireless communications network. The merged output signal may be provided to digital picture frames within the waiting room or some other defined area. Additionally, persons waiting in the waiting room may choose to receive the merged output signal on their smart phones, personal digital assistants, music players, slate computers, or other display devices such that they may view the broadcast content and proprietary targeted messages.

It should now be understood that the embodiments described herein may enable a business or institution to directly interact with its display device or devices in real time to display targeted messages in conjunction with broadcast content. A media control player is coupled to the display device that creates and provides a merged output signal to the display device. The media control player is coupled to a remote server that pulls inventory, sales and appointment data such that the proprietary targeted messages displayed on the display device include available inventory data relevant to the particular viewers of the display device.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A media control player comprising:
    a central processing unit;
    a graphics processing unit;
    an audio/video input;
    an audio/video output;
    a memory device comprising executable instructions that, when executed by the central processing unit, causes the media control player to:
        access an inventory system to determine a plurality of in-stock articles;
        retrieving sales data corresponding to a viewer within a viewing area of the display device, wherein the sales data includes one or more previous purchases by the viewer that are indicative of preferences of the viewer;
        compare the sales data corresponding to the viewer with the plurality of presently in-stock articles to select at least one presently in-stock article of the plurality of presently in-stock articles, wherein the selected at least one presently in-stock article corresponds with the preferences of the viewer;
        receive a proprietary targeted advertisement referring to the selected at least one presently in-stock article from a proprietary targeted message source;
        receive broadcast content from a broadcast source; and
        instruct the graphics processing unit to combine the proprietary targeted advertisement and the broadcast content into a merged output signal, and provide the merged output signal to the display device through the audio/video output such that the proprietary targeted advertisement is displayed in at least a message region of the display device and the broadcast content is displayed in a broadcast content region of the display device.

2. A media control player as claimed in claim 1, wherein the broadcast content is wirelessly transmitted content, cable-provided content, satellite-provided content, locally-stored content, proprietary content, streamed content, or combinations thereof.

3. A media control player as claimed in claim 2, wherein the proprietary content comprises video, audio and data created by a business associated with the media control player that is remotely-stored, locally-stored in the media control player on the memory device, or combinations thereof.

4. A media control player as claimed in claim 1, wherein the sales data is based on a vehicle previously purchased by the viewer.

5. A media control player as claimed in claim 1, wherein the sales data is based on service received by a viewer.

6. A media control player as claimed in claim 1, wherein data representing the merged output signal is locally stored in the memory device of the media control player.

7. A media control player as claimed in claim 1, further comprising a wireless communications device to wirelessly transmit the merged output signal to a plurality of display devices within a transmission range of the media control player.

8. A media control player as claimed in claim 1, wherein the proprietary targeted advertisement is a video targeted advertisement.

9. A media control player as claimed in claim 1, wherein the broadcast content and the proprietary targeted advertisement are overlaid on the display device such that at least a portion of the proprietary targeted advertisement is positioned within the broadcast content region of the display device.

10. A media control player as claimed in claim 1, wherein the graphics processing unit resizes the broadcast content such that the broadcast content is positioned within the broadcast content region of the display device.

11. A media control player as claimed in claim 1, wherein the media control player is communicatively coupled to at least one remote server and receives the proprietary targeted advertisement from the remote server controlled by a client-controlled hierarchy.

12. A method of providing proprietary targeted advertisements and broadcast content on a display device comprising:
    receiving broadcast content from a broadcast content source;
    determining a viewer within a viewing area of the display device;
    accessing a sales system to obtaining sales data associated with the viewer, the sales data corresponding to previous purchases by the viewer, wherein the sales data is indicative of preferences of the viewer;

accessing an inventory system to determine a plurality of presently in-stock articles;

comparing the sales data corresponding to the viewer with the plurality of presently in-stock articles;

selecting at least one presently in-stock article of the plurality of presently in-stock articles, wherein the selected at least one presently in-stock article corresponds with the preferences of the viewer;

creating a proprietary targeted advertisement referring to the selected at least one presently in-stock article; and merging the proprietary targeted advertisement and the broadcast content into a merged output signal, wherein the merged output signal is provided to the display device such that the display device simultaneously displays the proprietary targeted advertisement and the broadcast content.

13. A method as claimed in claim 12, wherein the broadcast content is wirelessly transmitted content, cable-provided content, satellite-provided content, locally-stored content, proprietary content, streamed content, or combinations thereof.

14. A method as claimed in claim 12, wherein determining the viewer within the viewing area of the display device comprises:

accessing an appointment database; and selecting a name of a person having a scheduled appointment within a date and time range.

15. A method as claimed in claim 12, wherein determining the viewer within the viewing area of the display device comprises receiving a wireless signal from an identification device associated with the viewer.

16. A method as claimed in claim 12, wherein determining the viewer within the viewing area of the display device comprises receiving a name of the viewer when the viewer registers at an enterprise.

17. A method as claimed in claim 12, further comprising filtering the inventory data to remove individual presently in-stock articles of the plurality of presently in-stock articles that do not correspond with the preferences of the viewer.

* * * * *

UNITED STATES PATENT AND TRADEMARK OFFICE
CERTIFICATE OF CORRECTION

PATENT NO. : 10,271,090 B2
APPLICATION NO. : 12/892203
DATED : April 23, 2019
INVENTOR(S) : Richard Winter, Thomas F. Jung and Predrag Dozgic Krpan Page 1 of 1

It is certified that error appears in the above-identified patent and that said Letters Patent is hereby corrected as shown below:

On the Title Page

Item (75) Inventors:
Change "Predraq Dozgic Krpan" to --Predrag Dozgic Krpan--

Item (73) Assignees:
Change "Predraq Dozgic Krpan" to --Predrag Dozgic Krpan--

Signed and Sealed this
Thirteenth Day of August, 2019

Andrei Iancu
*Director of the United States Patent and Trademark Office*